(12) United States Patent
Vanspeybroeck

(10) Patent No.: US 7,906,614 B2
(45) Date of Patent: Mar. 15, 2011

(54) POLYMER CATALYST DEACTIVATION AND ACID NEUTRALIZATION USING IONOMERS

(75) Inventor: Rory S. L. Vanspeybroeck, Bellem (BE)

(73) Assignee: Dow Global Technologies LLC, Midland, MI (US)

(*) Notice: Subject to any disclaimer, the term of this patent is extended or adjusted under 35 U.S.C. 154(b) by 0 days.

(21) Appl. No.: 12/305,029

(22) PCT Filed: Jun. 13, 2007

(86) PCT No.: PCT/US2007/013840
§ 371 (c)(1),
(2), (4) Date: Dec. 16, 2008

(87) PCT Pub. No.: WO2007/149275
PCT Pub. Date: Dec. 27, 2007

(65) Prior Publication Data
US 2009/0137754 A1 May 28, 2009

Related U.S. Application Data

(60) Provisional application No. 60/815,132, filed on Jun. 20, 2006.

(51) Int. Cl.
*C08F 6/02* (2006.01)
*C08F 210/16* (2006.01)
(52) U.S. Cl. .................. 528/482; 528/486; 525/919
(58) Field of Classification Search .............. 528/482, 528/486; 525/919
See application file for complete search history.

(56) References Cited

U.S. PATENT DOCUMENTS

| 4,770,782 A | * | 9/1988 | Wilkins et al. | 210/638 |
| 4,801,683 A | * | 1/1989 | May | 528/485 |
| 6,180,730 B1 | * | 1/2001 | Sibtain et al. | 526/84 |

OTHER PUBLICATIONS

Ionomer definition from http://www.accessscience.com (McGraw-Hill, 2009).*

* cited by examiner

*Primary Examiner* — Fred M Teskin

(57) ABSTRACT

A process for deactivating an active catalyst species in an olefin polymer stream exiting a polymerization reactor and neutralizing catalyst residues comprising adding to the olefin polymer stream in a quantity at least sufficient to inactivate the catalyst species and neutralize catalyst residues a composition comprising an ionomer having a molecular weight of at least 100 g/mol, and subsequently recovering the resulting polymer product.

9 Claims, 1 Drawing Sheet

US 7,906,614 B2

POLYMER CATALYST DEACTIVATION AND ACID NEUTRALIZATION USING IONOMERS

BACKGROUND OF THE INVENTION

This invention relates to a process for preparing olefin polymers using novel catalyst kill agents and/or neutralizers. Olefin polymers such as polyethylene and polypropylene are often produced by use of a transition metal polymerization catalyst thereby leaving small amounts of catalyst residues in the polymer. Such residues are typically thereafter deactivated to prevent continued polymerization and the deactivation products neutralized to reduce color body formation or corrosion due to the presence of hydrochloric acid or other by-products. This is normally accomplished by mixing one or more additives with the polymer while in a molten state or in the polymer containing product stream exiting a polymerization reactor prior to devolatilization.

A wide variety of deactivating agents have been utilized or disclosed in the prior art, generally hydroxyl group containing compounds, including water and water releasing compounds, optionally in combination with a neutralizer, including alcohols, phenols, diols, polyols, saccharides, ethers, epoxides, aldehydes, ketones, carboxylic acids, diacids and polyacids, their anhydrides, esters or salts, polyalkylene glycols, and amines; fatty acid salts; alcohols; polyalkylene glycols; polyvinyl alcohols; aliphatic alcohols; and salts of poly(oxyalkylene) compounds. References disclosing the foregoing include EP-67,645, EP-71,252, GB-2,132,214, EP-A-140131, WO92/14766, and WO03/55920.

Typically acid neutralizers and similar compounds are added in a two step process first employing a catalyst "kill" agent, such as water or an alcohol, followed by incorporating the neutralizer to scavenge acid species in the reaction mixture. Generation of strong acid residues, even for short periods, and subsequent removal by reaction with a scavenger has proven to be problematic due to exposure of the polymer at elevated temperatures within the recovery section of the reactor to the acid residue of the catalysts and inability to thereafter efficiently extract or neutralize such acid species. This can cause small quantities of acid, especially HCl, to become entrained in volatile components of the mixture and become incorporated into the recycle stream, leading to corrosion of recycle equipment. Additionally, typical acid neutralizers have proven to be susceptible to decomposition or oxidation over prolonged periods. Certain of the compounds additionally tend to separate from the polymer and migrate to the polymer surface during subsequent melt forming processes where they interfere with desired surface properties or esthetics of the polymer article or react with additives or other components of desired polymer blends or compositions. Finally, due to the relative inefficiency of previously known acid scavengers, excessive quantities thereof have been required in order to adequately reduce levels of catalyst residue in the polymer and acid species in the recycle stream. Accordingly, further improvement in polymer additives, especially acid neutralizing additives are desired. In particular, the attainment of equivalent or improved performance with reduced quantities of additives and, optionally, the use of a single component to achieve catalyst deactivation without generation of acidic by-products requiring further neutralization is desired.

U.S. Pat. No. 5,840,422 disclosed the use of ionomers as acid scavengers in blends of fluoropolymers with polyethylene. Other references disclosing use of ionomers to scavenge acidic species in polymeric compositions include U.S. Pat. No. 5,707,569 and U.S. Pat. No. 5,445,893. Adding ionomers to a process stream prior to devolatilization or use of an ionomer as a combination catalyst kill and acid neutralizer is not disclosed.

SUMMARY OF THE INVENTION

The present invention provides a process for deactivating an active catalyst species in an olefin polymer stream exiting a polymerization reactor and neutralizing catalyst residues comprising adding to the olefin polymer stream in a quantity at least sufficient to inactivate the catalyst species and neutralize catalyst residues a composition comprising an ionomer having a molecular weight of at least 100 g/mol, and subsequently recovering the resulting polymer product.

In another embodiment, the present invention provides a process for deactivating an active catalyst species in an olefin polymer stream exiting a polymerization reactor and concomitantly neutralizing catalyst residues comprising adding to the olefin polymer stream water or a hydroxyl group containing organic compound catalyst kill agent and an ionomer having a molecular weight of at least 100, and subsequently recovering the resulting polymer product.

In a further embodiment, the present invention provides a process for deactivating an active catalyst species in an olefin polymer stream exiting a polymerization reactor and concomitantly neutralizing catalyst residues comprising adding to the olefin polymer stream a catalyst kill and acid neutralization composition consisting essentially of an ionomer having a molecular weight of at least 100 g/mol, and subsequently recovering the resulting polymer product.

By use of the present ionomers as catalyst deactivation and/or acid scavenging agents, optionally in combination with conventional catalyst kill agents, especially prior to polymer devolatilization, it has been discovered that reduced quantities can be employed compared to conventional acid neutralization compositions while achieving thorough catalyst deactivation and, optionally, simultaneous reduction of acidic by-products in both the product and recycle stream, especially chloride containing by-products such as hydrochloric acid. Moreover, the resulting polymer compositions are characterized by reduced incidence of additive migration in subsequent processing steps and reduced interference with processing aids or other additives in subsequent polymer compositions, due to greater compatibility between the olefin polymer and ionomer.

DETAILED DESCRIPTION OF THE INVENTION

Figure 1:
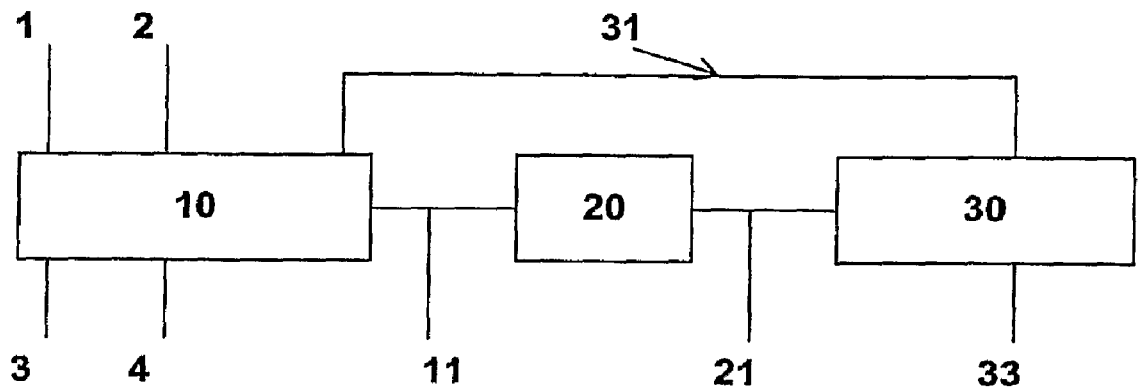
FIG. 1 is a schematic illustration of a polymerization process according to the present invention with catalyst deactivator addition occurring prior to neutralizer addition.

For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, raw materials, and general knowledge in the art. Unless stated to the contrary, implicit from the context, or customary in the art, all parts and percents are based on weight.

If appearing herein, the term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability. The term "consisting of", if used, excludes any component, step or procedure not specifically delineated or listed. The term "or", unless stated otherwise, refers to the listed members individually as well as in any combination.

The present invention preferably provides a process for producing olefin polymers, which comprises the steps of polymerizing an olefin monomer in a polymerization zone in the presence of a catalyst comprising a transition metal compound to form an olefin polymer, and adding at the end of or downstream from the polymerization zone a composition comprising an ionomer as previously disclosed.

Olefin polymers for use herein include any polymer formed by addition polymerization of one or more olefins, especially homopolymers and interpolymers of one or more $C_{2-10}$ α-olefins. Examples include homopolymers of ethylene, propylene, 1-butene or 4-methyl-1-pentene; interpolymers of ethylene with one or more $C_{3-10}$ α-olefins or styrene; interpolymers of two or more $C_{3-10}$ α-olefins; interpolymers of ethylene, one or more $C_{3-10}$ α-olefins and optionally styrene or a $C_{4-20}$ diolefin; and interpolymers of one or more $C_{3-10}$ α-olefins with styrene, a $C_{4-20}$ diolefin or a mixture of styrene with a $C_{4-20}$ α-olefin. Suitable interpolymers include block or random copolymers containing multiple monomer remnants in each polymer chain; graft copolymers containing polymer segments of one or more monomers pendant from a separately prepared polymer; and copolymer blends containing mixtures of individual polymer components, such as blends comprising a matrix of a relatively crystalline polymer component with occlusions or domains of a relatively rubbery polymer or homogeneous blends of two or more olefin polymers.

Preferred olefin polymers for use herein are isotactic polypropylene, low density polyethylene (LDPE), linear low density polyethylene (LLDPE), and high density polyethylene (HDPE). Highly preferred olefin polymers are LLDPE resins made by copolymerizing ethylene with one or more $C_{3-10}$ α-olefins, especially 1-butene, 1-hexene or 1-octene by use of a transition metal containing catalyst. Preferably, the polymers have a density from 0.85 to 0.98 g/cc, more preferably from 0.87 to 0.95 g/cc, and a weight average molecular weight (Mw) from 60,000 to 200,000.

Highly preferred olefin polymers are prepared by use of a catalyst comprising one or more transition metal derivatives and a cocatalyst or activator. Suitable transition metals are metals from groups 3-10 of Periodic Table of Elements. Examples of suitable compounds include titanium halides, vanadium halides, vanadium oxyhalides and the like or oxides, such as chromium trioxide, molybdenum trioxide, and the like. Also mixed oxy halides, hydrocarbyloxides, mixed halides and hydrocarbyloxides are advantageously used. As the cocatalyst or activator, there may be employed an organic aluminum compound such as trialkyl aluminum, dialkyl aluminum chloride, mixed orgaonaluminum-magnesium complexes or polymeric or oligomeric aluminum oxyalkoxides, such as methylalumoxane.

Suitable catalysts include both Ziegler-Natta catalysts and Phillips-type catalysts as well as complexes containing a transition metal having at least one delocalized π-electron containing ligand or electron donor ligand. Suitable compounds include metallocenes, half metallocenes, constrained geometry catalysts, single site catalysts, and post-metallocenes or donor complexes, the synthesis and use of which are well known to the skilled artisan.

Preferably, the olefin polymers employed in the present invention are prepared by use of a catalyst composition comprising halogen, a transition metal of Groups 3-6 of the Periodic Table of Elements, and optionally magnesium and/or an alkoxide; and an organoaluminum cocatalyst, specifically a Ziegler-Natta or Phillips type catalyst.

The process of the present invention can be carried out in conjunction with any of several different polymerization techniques. Suitable techniques include bulk polymerization, suspension polymerization, slurry polymerization, gas phase polymerization, solution polymerization, and high-pressure polymerization. Representative of such techniques is, for example, the solution polymerization method in which one or more olefins are polymerized in the presence of an inert hydrocarbon solvent at an average polymerization temperature above the softening point and preferably above the melting point of the resulting polymer, typically from 80 to 300° C., preferably from 100 to 300° C., most preferably from 130 to 275° C. The polymerization pressure typically is from 1 to 10 MPa. Illustrative of the high temperature, high pressure polymerization method using a transition metal catalyst is one wherein ethylene or a mixture of ethylene with one or more α-olefins is polymerized by feeding a transition metal polymerization catalyst at a polymerization temperature of 130 to 300° C. under a polymerization pressure of 10 to 300 MPa. Inert hydrocarbon diluents to be used in the solution or slurry polymerization techniques include butane, pentane, hexane, cyclohexane, heptane, octane, isooctane, nonane, decane, dodecane and mixtures thereof. Hydrogen or other chain transfer agents and polymerization temperature are typically used for controlling molecular weight of the olefin polymer.

In the process of the present invention multiple polymerization steps may be carried out in sequential or parallel polymerization zones, each employing the same or a different type of catalyst. The present catalyst kill and/or neutralizer composition can be used in some or all of the polymerization steps, however, desirably the polymer is not recovered until after exiting the final polymerization, whereupon a combined polymer product stream is recovered. U.S. Pat. No. 5,869,575 describes a polymerization processes for preparing polymer compositions of controlled composition and molecular weight distributions, wherein at least one homogeneous polymerization catalyst and at least one heterogeneous polymerization catalyst in separate reactors connected in series or in parallel is used.

According to a preferred process, ethylene and optionally another olefin are polymerized in a solution process under solution polymerization conditions in at least one reactor containing a homogeneous catalyst composition, and sequentially this polymer solution is passed into at least one other reactor containing a heterogeneous Ziegler catalyst, ethylene and optionally another alpha-olefin under solution polymerization conditions to form an additional polymer, and solvent is removed from the polymer solution and the polymer composition recovered. The homogeneous catalysts employed are desirably metallocene or post metallocene compounds as aforementioned.

According to the present invention, the catalyst deactivation and neutralization composition is added at the end of the polymerization zone or downstream from the polymerization zone. The reaction mixture emerging from the polymerization reactor or zone after completion of polymerization contains an olefin polymer, unaltered monomers, the polymerization catalyst a part of which may still be active and optionally an inert hydrocarbon diluent or solvent, when such a diluent or solvent is employed. In order to render the transition metal catalyst or its decomposition products inert after the polymer has been formed, the present composition is mixed with the reaction mixture at a time prior to entering the devolatilizer or other recovery equipment, sufficient to provide adequate catalyst deactivation and neutralization of acid species. Mixing may be practiced at a location which may be either before, at or after the outlet of the polymerization zone, typically formed by a reducing valve, if any, situated between the polymerization zone and the polymerization finishing steps, such as a polymer separator. As to the method for mixing, the polymer process stream and the additive composition stream may be simply mixed by combining the two streams into one stream. Alternatively, any other method may be available, so long as the catalyst components or its decomposition products can be rapidly contacted with the present composition. It has been found advantageous to employ forced mixing means, such as one or more static mixers or in-line mixers. The additive composition is preferably added before the polymer, and optional solvent or diluent, is subjected to separation steps to remove unreacted monomer or solvent. Such removal is typically done at elevated temperature or decreased pressure, or both, to flash off the monomer and diluent. There can be one or two or more of such separation steps in sequence. In the process, the polymer and ionomer remain within the molten polymer stream whereas the unreacted monomers, diluent and other gases are removed therefrom. In continuous processes, the unreacted monomers, any diluent and other gasses may be separated, optionally purified, and recycled into the process again, if desired.

To maximize retention of the neutralized acid products in the polymeric product (consequently reducing as fully as possible exposure of recycle equipment to acidic species) and avoiding alteration of polymer product properties, the ionomer should have a number average molecular weight of at least 100 g/mol, more preferably at least 500 g/mol and most preferably at least 5,000 g/mol.

Ionomers are known polymers prepared by neutralization of carboxylic-, sulfonic-, sulfuric-, phosphonic- or phosphoric-acid groups in polymers prepared by (co)polymerization of ethylenically unsaturated acids or anhydrides or other means of incorporation the aforementioned acid groups. Preferred ionomers are partially or fully neutralized homopolymers of acrylic acid, methacrylic acid, or maleic anhydride as well as copolymers or graft copolymers of the foregoing monomers with ethylene, propylene, mixtures of ethylene and propylene, mixtures of ethylene and one or more higher α-olefins, or mixtures of ethylene, one or more higher α-olefins, and a conjugated or non-conjugated diene. Neutralization is desirably conducted by use of basic ammonium or metal compounds, especially ammonium hydroxides, metal hydroxides, most especially hydroxides of metals selected from groups 1, 2, 12 and 13 of the Periodic Table of the Elements. Suitable ammonium salts are those having from 0 to 3 $C_{1-40}$ hydrocarbyl groups in each ammonium cation.

Alkali metal ionomers based on sodium or potassium, especially sodium- or potassium hydroxide neutralized copolymers of ethylene/acrylic acid or ethylene/methacrylic acid, are particularly useful in connection with the present invention. A high degree of neutralization is advantageous in increasing the effectiveness of the ionomers to act as both catalyst neutralizers and acid scavengers. Desirably, from 10 to 100, more desirably from 15 to 100 percent of the acid groups are neutralized in the ionomer resin. Most highly preferred ionomers are those having a number average molecular weight from 100 to 500,000, more preferably from 500 to 100,000, most preferably from 5,000 to 50,000 and a acid group monomer content from 0.1 to 20 mole percent, preferably from 0.5 to 15 mole percent. Suitable examples of ionomer resins for use herein are available under the trade designation Surlyn™, available from E. I. du Pont de Nemours and Company. Ionomers can also be made through complete or partial neutralization of the acid groups of carboxylic acid containing polymers such as Primacor™ brand ethylene/acrylic acid copolymer resins (available from The Dow Chemical Company).

Additional suitable ionomers include hybrid resins prepared by neutralizing the acid groups of a carboxylic acid-containing polymers with a combination of basic compounds, especially two or more metal hydroxides. For example, a 10 percent neutralized sodium ionomer can be further reacted with a non-sodium base such as potassium hydroxide to achieve further or complete neutralization, or a zinc ionomer which is 20 percent neutralized may be further reacted, for example by reactive extrusion, with sodium hydroxide, to achieve additional or complete neutralization of acid functionality.

In one embodiment of the invention the ionomer is prepared in the form of an aqueous dispersion by complete or partial neutralization of an acid containing polymer in an aqueous reaction medium. For example, copolymers of ethylene and acrylic acid or methacrylic acid are readily prepared as aqueous dispersions having a solids content of 25-35 percent by contacting the resin with a base such as sodium hydroxide or ammonium hydroxide at a temperature of 95-110° C. Preferred resins are copolymers of ethylene and acrylic acid having acrylic acid contents greater than about 17 weight percent, and melt indexes greater than about 300 g/10 min. Relatively high solid content, low viscosity dispersions can be prepared in this manner without use of surfactants, cosolvents, salts, or protective colloids, which would possible be detrimental to properties of the olefin polymer to which the dispersion is added. Additional details concerning the preparation of aqueous ionomer dispersions in this manner are disclosed in the publication, "Preparation of Aqueous Dispersions of PRIMACOR™ Copolymers", available from The Dow Chemical Company.

Desirably, the ionomer, either neat, in a solution, or as an aqueous dispersion is added in an amount of at least 0.01 weight percent, preferably at least 0.02 weight percent, most preferably at least 0.05 weight percent based on olefin polymer weight, and at most 10 weight percent, preferably at most 5 weight percent, most preferably at most 1.0 weight percent, based on olefin polymer weight. Suitable aqueous dispersions or solutions comprise from 0.1 to 60 percent ionomer by weight.

The method by which the ionomer is incorporated into the polymer is not critical to successful practice. In one embodiment, the ionomer is added at the end of the polymerization zone or downstream from the polymerization zone and prior to entering the devolatilizer. The reaction mixture emerging from the polymerization reactor or zone after completion of polymerization generally comprises the olefin polymer, unaltered monomers, polymerization catalyst, all or a part of which may still be active, and optionally inert hydrocarbon diluents and/or other components. In one embodiment of the present invention, conventional catalyst terminating agents such as water, alcohols, $CO_2$, and CO, are substantially absent from the product stream or the quantity thereof is at least reduced from that employed in conventional practices.

The ionomer and the polymer stream may be thoroughly mixed by passing through one or more static mixing elements or by use of a mechanical agitator, if desired, before devolitilization. By using ionomers according to the present preferred embodiments, the neutralization products possess viscosity and volatility properties such that they are readily incorporated into the olefin polymer at common temperatures utilized in recovery of polymers, typically from 120 to 250° C. In addition, highly desired ionomers are those that are readily dispersed or dissolved in water or aqueous media. By using an aqueous dispersion or solution of the ionomer, the aqueous component acts as the catalyst kill and the ionomer simultaneously neutralizes any acidic by-products.

Preferably, the ionomer is added to the polymer stream in the form of a slurry of comminuted particles thereof, as a solution or dispersion in a suitable solvent or diluent, or neat as molten polymer, before the polymer, and optional diluent, is subjected to separation steps to remove unreacted monomer or solvent. Such removal is typically done while increasing the temperature or decreasing the pressure, or both, to flash off the monomer and diluent. There can be one or two or more such separation steps in sequence, if desired. In a solution polymerization process or in a high temperature high-pressure polymerization process, the polymer, catalysts residues, and ionomer remain within the molten polymer stream whereas the unreacted monomers, diluent and other volatile components are removed therefrom.

In another embodiment, the ionomer is introduced in the form of an aqueous dispersion or mixture and catalyst deactivation is at least partially accomplished by reaction with water contained in the dispersion, while concomitantly neutralizing acid by-products resulting from the deactivation by reaction with ionomer. In this embodiment, the concentration of ionomer in the aqueous dispersion can be adjusted to provide precise catalyst deactivation as well as scavenging of acid by-products without using excessive quantities of ionomer. In attaining this objective, the concentration of ionomer may exceed the solubility limits for forming an aqueous solution or dispersion and a mixture in which the ionomer is the major component may instead be employed. Preferred, aqueous dispersions are those containing from 30 to 60 percent, more preferably from 35 to 50 percent ionomer. Suitable techniques for forming aqueous dispersions of ionomers are known to the skilled artisan, and disclosed for example, in U.S. Pat. Nos. 5,206,279, 5,387,635 or 2005/0100754.

The process of the present invention may be further illustrated by reference to the accompanying figures. In FIG. 1 there is depicted in schematic form a polymerization process including a reactor unit 10, having associated monomer supply 1, solvent supply 2, catalyst supply 3, and cocatalyst supply 4. It is understood that multiple reactors may comprise the reactor unit. Polymer containing reaction mixture exits the reactor unit and is combined with catalyst deactivator from supply 11, before entering mixer unit 20, preferably comprising one or more static mixers. After exiting the mixer unit, neutralizer from supply 21 is combined with the reaction mixture and the resulting admixture supplied to devolatilizer unit, 30. Volatile components of the reaction mixture are separated by the devolatilizer unit, which may comprise one or more stages, are recovered and conveyed to the reactor unit 10 by conduit 31. Recovered polymer product containing deactivated and neutralized catalyst residue is removed at the discharge, 33. Where the ionomer serves as both deactivator and neutralizer, other additives, such as one or more antioxidants and/or stabilizers, may instead be charged from supply 21.

Figure 2:
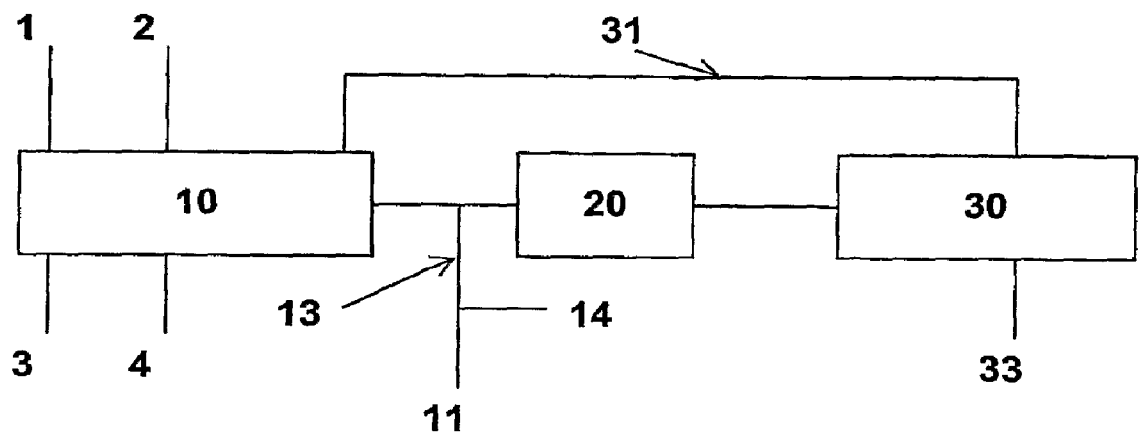
FIG. 2 is a schematic illustration of a polymerization process according to the present invention with catalyst deactivator addition and neutralizer addition occurring simultaneously.

In FIG. 2 there is depicted a similar polymerization process including a reactor unit 10, having associated monomer supply 1, solvent supply 2, catalyst supply 3, and cocatalyst supply 4. Polymer containing reaction mixture exits the reactor unit and is combined with the combined stream 13, resulting from mixing catalyst deactivator from supply 11 and neutralizer from supply 14, before entering the mixer unit 20. After exiting the mixer unit, the resulting admixture is supplied to devolatilizer unit, 30. Volatile components of the reaction mixture are separated by the devolatilizer unit, recovered and conveyed to the reactor unit 10, by conduit 31. Recovered polymer product containing deactivated and neutralized catalyst residue is removed at the discharge, 33. Where the ionomer serves as both deactivator and neutralizer, other additives, such as one or more antioxidants and/or stabilizers, may instead be charged from supply 14.

The resultant olefin polymer may be compounded with conventional additives such as stabilizers, UV-absorbers, antistatic agents, antiblocking agents, lubricants, pigments, inorganic or organic fillers, fire-retardant compounds, antidrip agents, or additional polymers such as rubbers or fluorinated polymers, especially fluoroelastomers, optionally in combination with an interfacial agent such as a poly(oxyalkylene) polymer. Normally such additional additives are desirably added in one or more subsequent compounding processes, however, addition of one or more such additives simultaneously with the present catalyst deactivation and acid neutralization agent may be employed without departing from the scope of the present invention.

The polymers obtained according to the present invention are suitable for many types of applications, including those that require excellent optical properties and high stretch ratios, such as fiber spinning applications, injection molding, blow molding, rotomolding, and blown or cast film applications.

The following enumerated specific embodiments are provided as enablement for the appended claims:

1. A process for deactivating an active catalyst species in an olefin polymer stream exiting a polymerization reactor and neutralizing catalyst residues comprising adding to the olefin polymer stream in a quantity at least sufficient to inactivate the catalyst species and neutralize catalyst residues a composition comprising an ionomer having a molecular weight of at least 100 g/mol, and subsequently recovering the resulting polymer product.

2. A process for deactivating an active catalyst species in an olefin polymer stream exiting a polymerization reactor and concomitantly neutralizing catalyst residues comprising adding to the olefin polymer stream water or a hydroxyl group containing organic compound catalyst kill agent and an ionomer having a molecular weight of at least 100 g/mol, and subsequently recovering the resulting polymer product.

3. A process for deactivating an active catalyst species in an olefin polymer stream exiting a polymerization reactor and concomitantly neutralizing catalyst residues comprising adding to the olefin polymer stream a catalyst kill and acid neutralization composition consisting essentially of an ionomer having a molecular weight of at least 100 g/mol, and subsequently recovering the resulting polymer product.

4. A process according to any one of embodiments 1-3 wherein the ionomer is added to the olefin polymer stream prior to devolatilization of the polymer stream and the polymer product is recovered by devolatilization of the polymer stream.

5. The process according to any one of embodiments 1-4 wherein the olefin polymer is a homopolymer of ethylene or propylene or a copolymer of ethylene with one or more $C_{3-10}$ α-olefins prepared by use of a transition metal containing catalyst composition.

6. The process according to any one of embodiments 1-5 wherein the catalyst composition comprises halogen, a transition metal of Groups 3-6 of the Periodic Table of Elements, and optionally magnesium and/or an alkoxide; and an organoaluminum cocatalyst.

7. The process according to any one of embodiments 1-6 wherein the ionomer is a potassium hydroxide or sodium hydroxide partially or fully neutralized copolymer of ethylene with acrylic acid or methacrylic acid, said copolymer having a number average molecular weight from 500 g/mol to 5,000 g/mol.

8. The process according to any one of embodiments 1-7 wherein from 0.01 to 10 percent of ionomer based on olefin polymer weight is employed.

9. The process according to any one of embodiments 1-8 wherein the olefin polymer is a homopolymer of ethylene or propylene or a copolymer of ethylene with one or more $C_{3-10}$ α-olefins prepared by use of a transition metal containing catalyst composition.

10. A polymeric product obtained by the process of any one of embodiments 1-9.

The invention is further illustrated by the following examples that should not be regarded as limiting of the present invention. Unless stated to the contrary or conventional in the art, all parts and percents are based on weight.

EXAMPLE 1 AND COMPARATIVE A

Relative average molecular weight of the ionomer is determined by gel permeation chromatography (GPC). Neutralization levels are determined by titration with sodium hydroxide. Melt index values are determined according to ASTM-D-1238 Procedure A, Condition E at 190° C./2.16 kg.

An ethylene/1-octene polymer is prepared in two continuous stirred tank reactors (CSTR's) of 5 liters volume each operated in series. The reactors are equipped with a shell to keep the reactor volume at adiabatic conditions. The feed to the first reactor comprises a mixture of $C_{8-10}$ n-alkane containing 20 percent ethylene which is charged at a rate of 30 kg/hr. The temperature of the solvent/ethylene feed is 15° C. and the pressure is maintained at 3.5 MPa. 1-Octene is added as a separate stream into the first reactor. By an additional separate stream, fresh solvent, a Ziegler-Natta procatalyst comprising a suspension of a $MgCl_2$ supported $TiCl_4$ in the same n-alkane mixture is injected into the first reactor at a rate of about 0.01 g Ti/hr. The procatalyst is prepared essentially according to the procedure of U.S. Pat. No. 4,547,475 and contains Mg/Cl/Al/Ti in the mole ratios 13/35/4/1. Together with the procatalyst, triethylaluminum cocatalyst is fed in an amount of 3.5 mole of Al per mole of Ti. During the subsequent polymerization of the ethylene/octene mixture, approximately 80 percent of the ethylene is converted and the reactor temperature increases to 180° C. The reaction mixture comprising dissolved polymer enters into the second reactor where approximately 10 percent additional ethylene is converted, increasing the reaction temperature to 200° C. at a pressure of 3.5 MPa. About 5.2 kg polymer per hour is formed having a melt index of 3.0 and a density of 0.914 g/cm³ and containing about 12 percent polymerized 1-octene.

After the product stream containing polymer, monomer, solvent and catalyst leaves the second reactor, 0.1 percent by weight, based on polymer loading, of a 40 percent aqueous dispersion of a sodium hydroxide neutralized ethylene/acrylic acid copolymer containing 20.5 percent by weight acrylic acid units (POD™ 5101 available from The Dow Chemical Company) is injected prior to passing the mixture through an in-line static mixer. Hindered phenol antioxidants (Irganox™ 1010 and Irganox™ 1076 available from Ciba Geigy Corporation) and a stabilizer (Irgafos™ 168, also from Ciba-Geigy Corporation) are then added at levels of 200 ppm, 250 ppm, and 1000 ppm respectively, based on ethylene/1-octene copolymer weight.

The product stream is heated to 250° C. at 3.5 MPa and devolatilized in a two stage devolatilization process. The first stage operates at 1.5 MPa and 200° C. after which the polymer stream is reheated to 250° C. and passed into a flash vessel where remaining solvent is removed under vacuum. The resulting molten polymer stream then passes through a melt forming die and cutter, and is cooled in a water bath to give solid pellets, having a residual solvent content of 0.2 percent and ionomer content of 400 ppm based on ethylene/1-octene copolymer. The polymerization is discontinued after producing about 25 kg of polymer. HCl content in the unreacted ethylene vent exiting the devolatilizer is determined once steady state operating conditions are attained.

Comparative resins prepared by use of hydrated calcium stearate as neutralizer and catalyst kill are prepared in substantially the same manner using a 9 weight percent suspension of hydrated calcium stearate containing 2-3 percent water in the above mixed alkanes solvent (1250 ppm calcium stearate based on ethylene/1-octene copolymer weight).

The polymer products thus produced are subjected to HCl measurements in the vapor phase above the die during extrusion. Extrusion experiments are conducted on a laboratory scale APV Baker MP19TC co-rotating twin screw extruder with 19 mm screw diameter and barrel length of 40 D. The temperature profile in zones 1 to 7 is 170° C. to 230° C. with increments of 10° C., the die temperature is 240° C. and melt temperatures are between 248° C. and 251° C. The extruder is operated at 300 rpm, torque between 57 and 74 percent, and an output between 2.9 and 3.1 kg/hr. Samples are collected by suction using Drager tubes with a sensitivity range of 1-10 ppm/liter of sample volume. Samples taken during extrusion are collected over 20 minutes at a flow rate of 520 ml/min, with the Drager tube inlet located 0.7 cm above the die opening. Measurements of the ethylene vent gas are also determined by use of Drager tubes at a flow rate of 520 ml/min until a value of 10 ppm or a maximum sample time of 5 minutes is reached. The recorded values are normalized for 1 liter of sample gas. Results are listed in Table 1.

TABLE 1

| Run | HCl polymer[1] (ppm) | HCl recycle[2] (ppm) |
|---|---|---|
| Ex. 1 | 0.02 | 2 |
| A* | 0.03-0.16 | 9-23 |

*comparative, not an example of the invention
[1]in air, measured above die during extrusion
[2]in volatile component exiting devolatilizer The above results show that the ionomer achieved a greater degree of catalyst neutralization and acid scavenging even when employed at lower weight loadings (400 ppm ionomer versus 1200 ppm calcium stearate). Not only is less volatile acidic residue released from the polymer during processing, but HCl levels measured in the unreacted ethylene vent stream are also significantly lower, thereby leading to reduction of corrosion in the recycle equipment. No fouling of recycle lines or other post reactor equipment due to build up of volatilized neutralization agent is observed using the ionomeric catalyst neutralizer as well.

What is claimed is:

1. A process for deactivating an active catalyst species in an olefin polymer stream exiting a polymerization reactor and neutralizing catalyst residues comprising adding to the olefin polymer stream in a quantity at least sufficient to inactivate the catalyst species and neutralize catalyst residues a composition comprising an ionomer having a molecular weight of at least 100 g/mol, and subsequently recovering the resulting polymer product, wherein the ionomer is a potassium hydroxide or sodium hydroxide partially or fully neutralized copolymer of ethylene with acrylic acid or methacrylic acid, said copolymer having a number average molecular weight from 500 g/mol to 5,000 g/mol.

2. A process for deactivating an active catalyst species in an olefin polymer stream exiting a polymerization reactor and concomitantly neutralizing catalyst residues comprising adding to the olefin polymer stream water or a hydroxyl group containing organic compound catalyst kill agent and an ionomer having a molecular weight of at least 100 g/mol, and subsequently recovering the resulting polymer product, wherein the ionomer is a potassium hydroxide or sodium hydroxide partially or fully neutralized copolymer of ethylene with acrylic acid or methacrylic acid, said copolymer having a number average molecular weight from 500 g/mol to 5,000 g/mol.

3. A process for deactivating an active catalyst species in an olefin polymer stream exiting a polymerization reactor and concomitantly neutralizing catalyst residues comprising adding to the olefin polymer stream a catalyst kill and acid neutralization composition consisting essentially of an ionomer having a molecular weight of at least 100 g/mol, and subsequently recovering the resulting polymer product, wherein the ionomer is a potassium hydroxide or sodium hydroxide partially or fully neutralized copolymer of ethylene with acrylic acid or methacrylic acid, said copolymer having a number average molecular weight from 500 g/mol to 5,000 g/mol.

4. A process according to any one of claims 1-3 wherein the ionomer is added to the olefin polymer stream prior to devolatilization of the polymer stream and the polymer product is recovered by devolatilization of the polymer stream.

5. The process according to any one of claims 1-3 wherein the olefin polymer is a homopolymer of ethylene or propylene or a copolymer of ethylene with one or more $C_{3-10}$ α-olefins prepared by use of a transition metal containing catalyst composition.

6. The process according to any one of claims 1-3 wherein the catalyst composition comprises halogen, a transition metal of Groups 3-6 of the Periodic Table of Elements, and optionally magnesium and/or an alkoxide; and an organoaluminum cocatalyst.

7. The process according to any one of claims 1-3 wherein from 0.01 to 10 percent of ionomer based on olefin polymer weight is employed.

8. The process according to claim 7 wherein the olefin polymer is a homopolymer of ethylene or propylene or a copolymer of ethylene with one or more $C_{3-10}$ α-olefins prepared by use of a transition metal containing catalyst composition.

9. The process according to claim 8 wherein the catalyst composition comprises halogen, a transition metal of Groups 3-6 of the Periodic Table of Elements, and optionally magnesium and/or an alkoxide; and an organoaluminum cocatalyst.

* * * * *